United States Patent [19]
Chen et al.

[11] Patent Number: 5,938,229
[45] Date of Patent: Aug. 17, 1999

[54] ONE-HANDED FOLDABLE STROLLER

[75] Inventors: Er-Jui Chen, Kaohsiung; Hung-Chung Hou, Taipao; Ying-Yuan Huang, Chiayi, all of Taiwan

[73] Assignee: Link Treasure Limited, Tortola, United Kingdom

[21] Appl. No.: 09/114,048

[22] Filed: Jul. 13, 1998

[51] Int. Cl.⁶ ....................................................... B62B 7/06
[52] U.S. Cl. ....................................... 280/642; 280/47.38
[58] Field of Search ................................... 280/642, 638, 280/639, 644, 655, 647, 650, 47.25, 47.38

[56] References Cited

U.S. PATENT DOCUMENTS 5,775,718  7/1998  Huang ...................................... 280/642

FOREIGN PATENT DOCUMENTS 257-588  3/1988  European Pat. Off. ............... 280/642

*Primary Examiner*—J J Swann
*Assistant Examiner*—Frank B Vanaman
*Attorney, Agent, or Firm*—Bacon & Thomas, PLLC

[57] ABSTRACT

A stroller includes two front legs each having an upper end portion and a lower end portion, two push handles each having an upper end portion, a mediate portion and a lower end portion detachably secured to the upper end portion of one of the two front legs, two rear legs each having an upper end portion pivotally connected to the mediate portion of one of the two push handles and a lower end portion, two release devices each mounted between one of the two front legs and one of the two push handles for detaching the lower end portion of the push handle from the upper end portion of the front leg, a substantially U-shaped handlebar having two end portions each fixedly mounted on the upper end portion of one of the two push handles and a mediate portion formed with a supporting rod, and a driving device mounted on the supporting rod of the handlebar and connected with each of the two release devices for driving each of the two release devices to detach the lower end portion of the push handle from the upper end portion of the front leg.

7 Claims, 7 Drawing Sheets

5,938,229

ONE-HANDED FOLDABLE STROLLER

FIELD OF THE INVENTION

The present invention relates to a stroller, and more particularly to a onehanded foldable stroller.

BACKGROUND OF THE INVENTION

A conventional stroller has a complicated structure and cannot be folded easily. The present invention has arisen to mitigate and/or obviate the disadvantage of the conventional stroller.

SUMMARY OF THE INVENTION

In accordance with one aspect of the present invention, there is provided a stroller comprising two front legs each having an upper end portion and a lower end portion, two push handles each having an upper end portion, a mediate portion and a lower end portion detachably secured to the upper end portion of one of the two front legs, two rear legs each having an upper end portion pivotally connected to the mediate portion of one of the two push handles and a lower end portion, two release devices each mounted between one of the two front legs and one of the two push handles for detaching the lower end portion of the push handle from the upper end portion of the front leg, a substantially U-shaped handlebar having two end portions each fixedly mounted on the upper end portion of one of the two push handles and a mediate portion formed with a supporting rod, and a driving device mounted on the supporting rod of the handlebar and connected with each of the two release devices for driving each of the two release devices to detach the lower end portion of the push handle from the upper end portion of the front leg.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
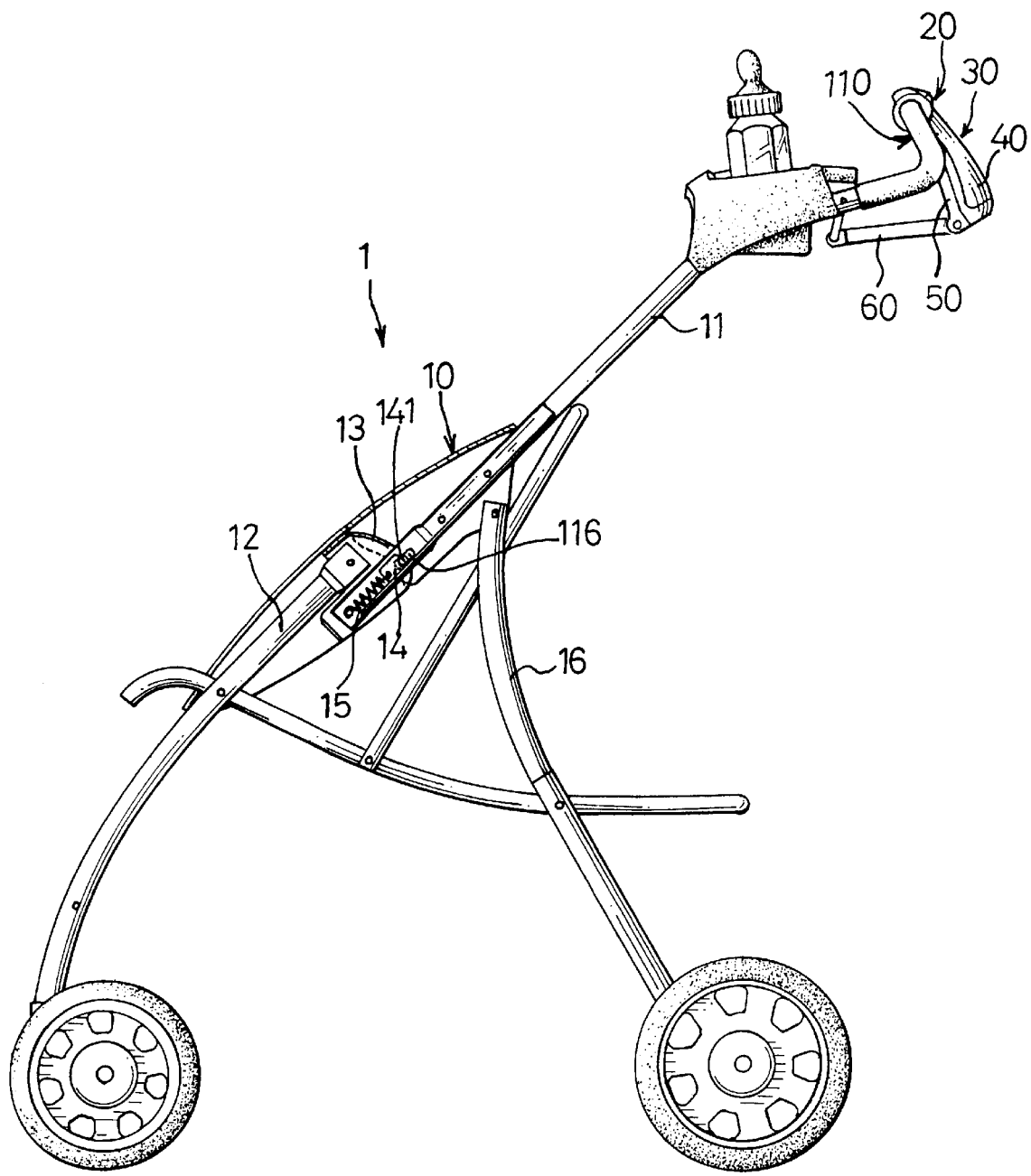
FIG. 1 is a front plan view of a stroller in accordance with the present invention.

Referring to the drawings and initially to FIGS. 1–4, a one-handed foldable stroller 1 in accordance with the present invention comprises two front legs 12 each having an upper end portion and a lower end portion, two push handles 11 each having an upper end portion, a mediate portion and a lower end portion detachably secured to the upper end portion of one of the two front legs 12, two rear legs 16 each having an upper end portion pivotally con- nected to the mediate portion of one of the two push handles 11 and a lower end portion, two release devices 10 each mounted between one of the two front legs 12 and one of the two push handles 11 for detaching the lower end portion of the push handle 11 from the upper end portion of the front leg 12, a substantially U-shaped handlebar 110 having two end portions each fixedly mounted on the upper end portion of one of the two push handles 11 and a mediate portion formed with a supporting rod 111, and a driving device 20 mounted on the supporting rod 11 of the handlebar 110 and connected with each of the two release devices 10 for driving each of the two release devices 10 to detach the lower end portion of the push handle 11 from the upper end portion of the front leg 12.

The driving device 20 comprises a pivot member 30 pivotally mounted on the supporting rod 111 of the handle- bar 110, a linking lever 60 including a first end portion pivotally connected with the pivot member 30 and a second end portion, a substantially U-shaped drawing bar 62 piv- otally secured to the second end portion of the linking lever 60 and including two bent end portions 620 each pivotally mounted on the upper end portion of one of the two push handles 11, two drawing wires 64 each including a first end portion secured to one of the two end portions 620 of the drawing bar 62 and a second end portion secured to one of the two release devices 10 for detaching the lower end portion of each of the two push handles 11 from the upper end portion of each of the two front legs 12, and two returning springs 63 each including a first end portion secured to one of the two end portions 620 of the drawing bar 62 and a second end portion secured to the upper end portion of one of the two push handles 11.

The supporting rod 111 of the handlebar 110 radially contains a through hole 113, and the pivot member 30 comprises a first pivot base 40 including an upper end portion formed with a semi-cylindrical first end cap 41 pivotally mounted on the supporting rod 110 and containing a retaining bore 411 aligning with the through hole 113 and a guiding groove 412 open to the retaining bore 411 and having a dimension smaller than that of the retaining bore 411, a second pivot base 50 including an upper end portion formed with a semi-cylindrical second end cap 51 pivotally mounted on the supporting rod 110 and fixedly coupled with the first end cap 41, and including a lower end portion 55 pivotally connected with the first end portion of the linking lever 60, a positioning pin 47 including a lower end portion 473 mounted in the supporting rod 111, a mediate portion formed with an annular shoulder 472 abutting the inner wall of the supporting rod 111 and an upper end portion 471 slidably extending through the through hole 113 and the retaining bore 411 and having a dimension greater than that of the guiding groove 412, a boss 474 formed on the upper end portion 471 of the positioning pin 47 and extending outward of the retaining bore 411 and having a dimension smaller than that of the guiding groove 412, a biasing member 475 such as a spring mounted on the lower end portion 473 of the positioning pin 47 and abutting the inner wall of the supporting rod 111, and a pressing member 44 pivotally mounted on the first end cap 41 of the first pivot base 40 and pressing on the boss 474 of the positioning pin 47.

The first end cap 41 of the first pivot base 40 is formed with two juxtaposed lugs 42 for receiving the pressing member 44 therebetween. The supporting rod 111 contains a large hole 112 for passage of the lower end portion 473 of the positioning pin 47 and the biasing member 475, and the second end cap 51 of the second pivot base 50 contains an elongated slot 52 for passage of the lower end portion 473 of the positioning pin 47, wherein the biasing member 475 abuts and presses the inner wall of the elongated slot 52.

Figure 2:
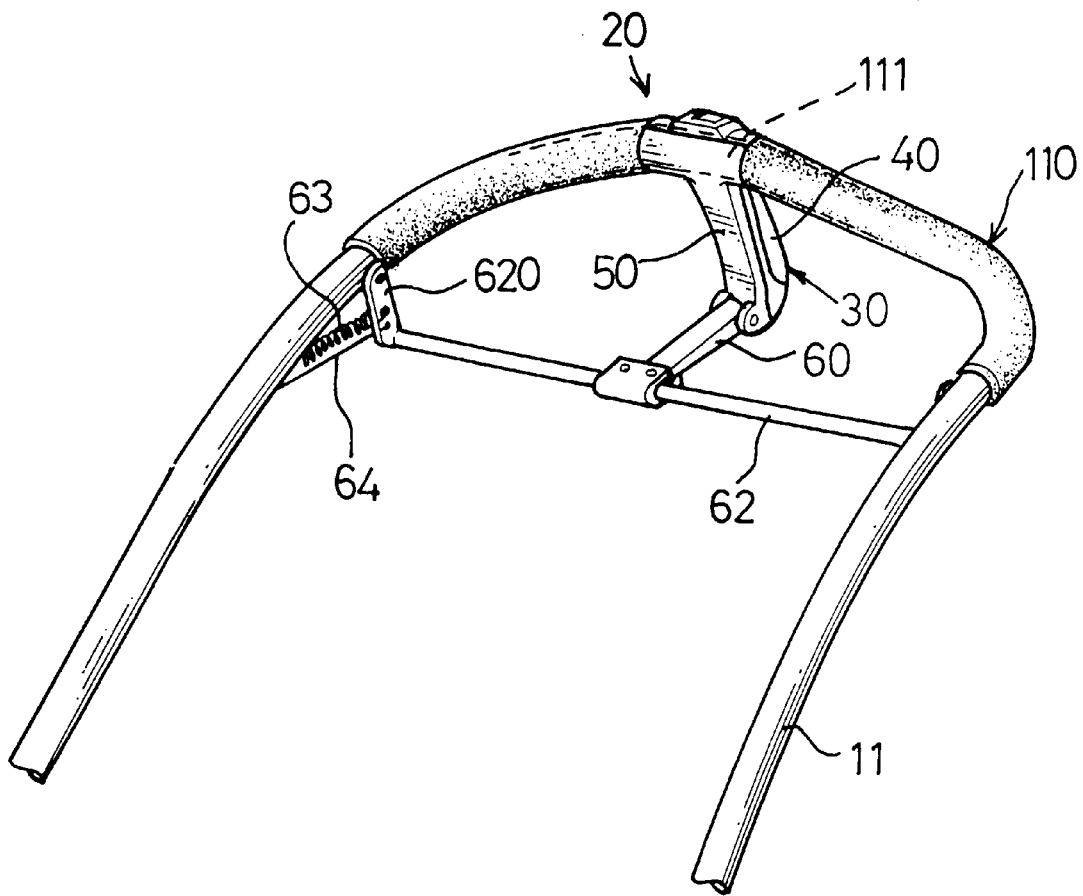
FIG. 2 is a partially cut-away perspective view of the stroller handle as shown in FIG. 1.
Figure 3:
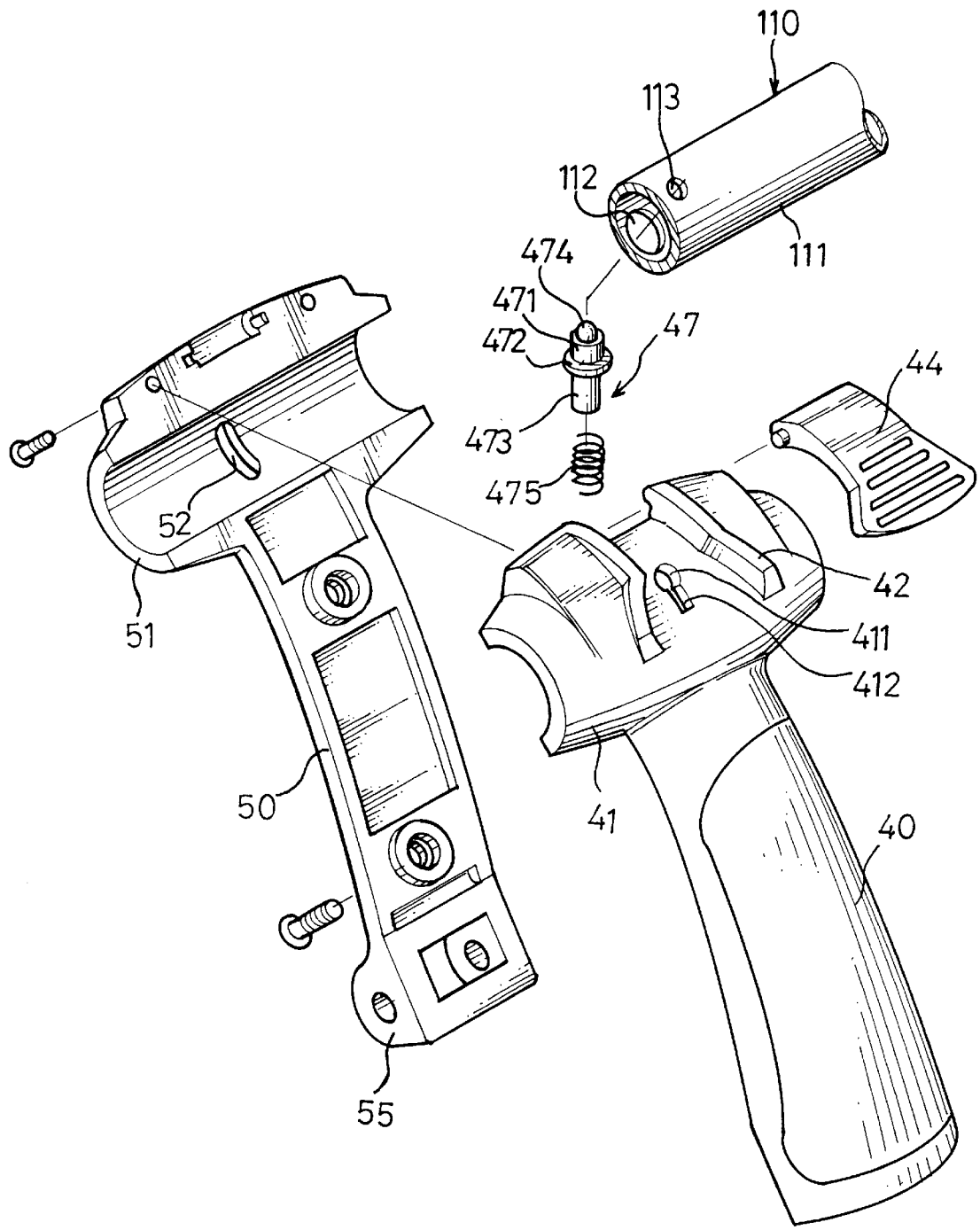
FIG. 3 is an exploded view of a driving device in accordance with the present invention.
Figure 4:
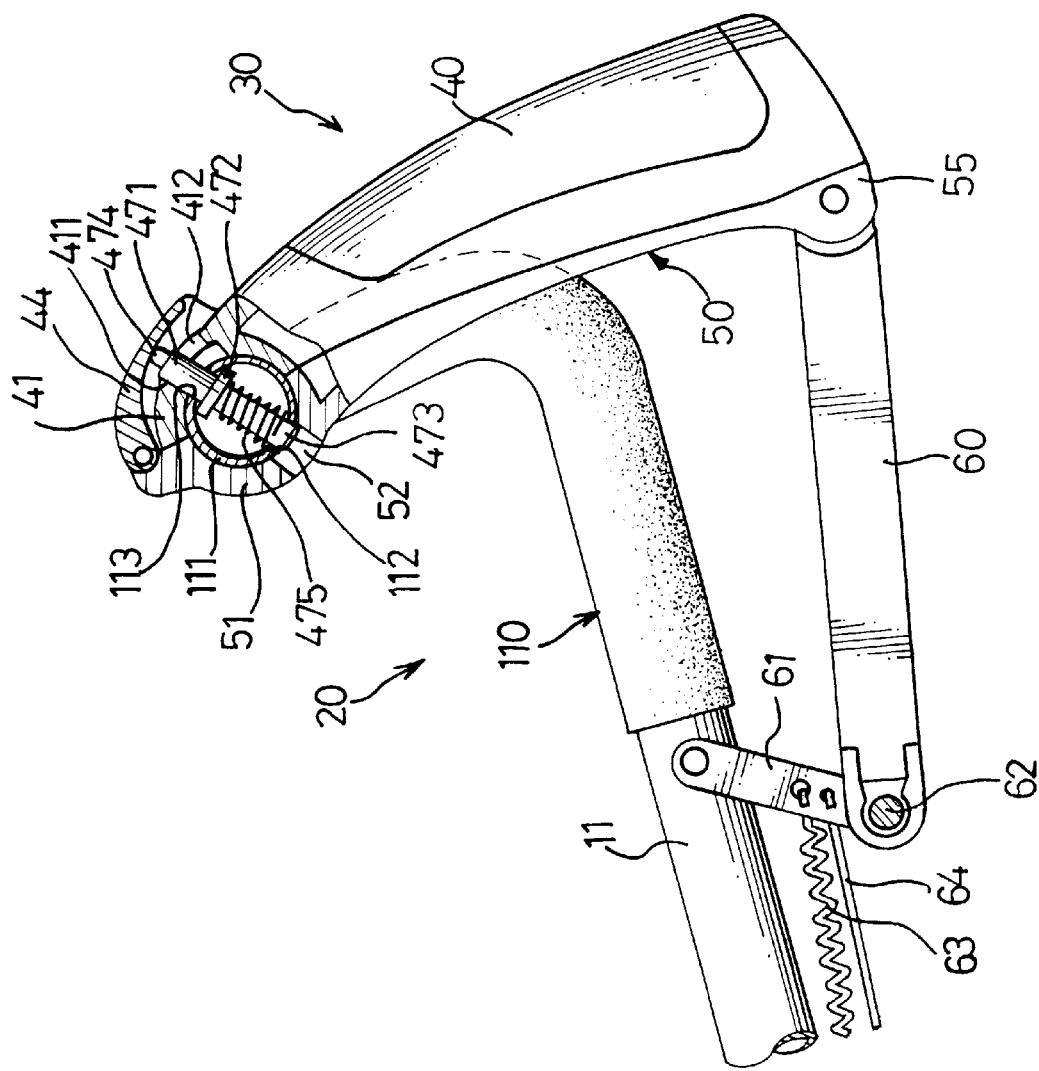
FIG. 4 is a front plan partially cross-sectional view of the driving device as shown in FIG. 3.
Figure 5:
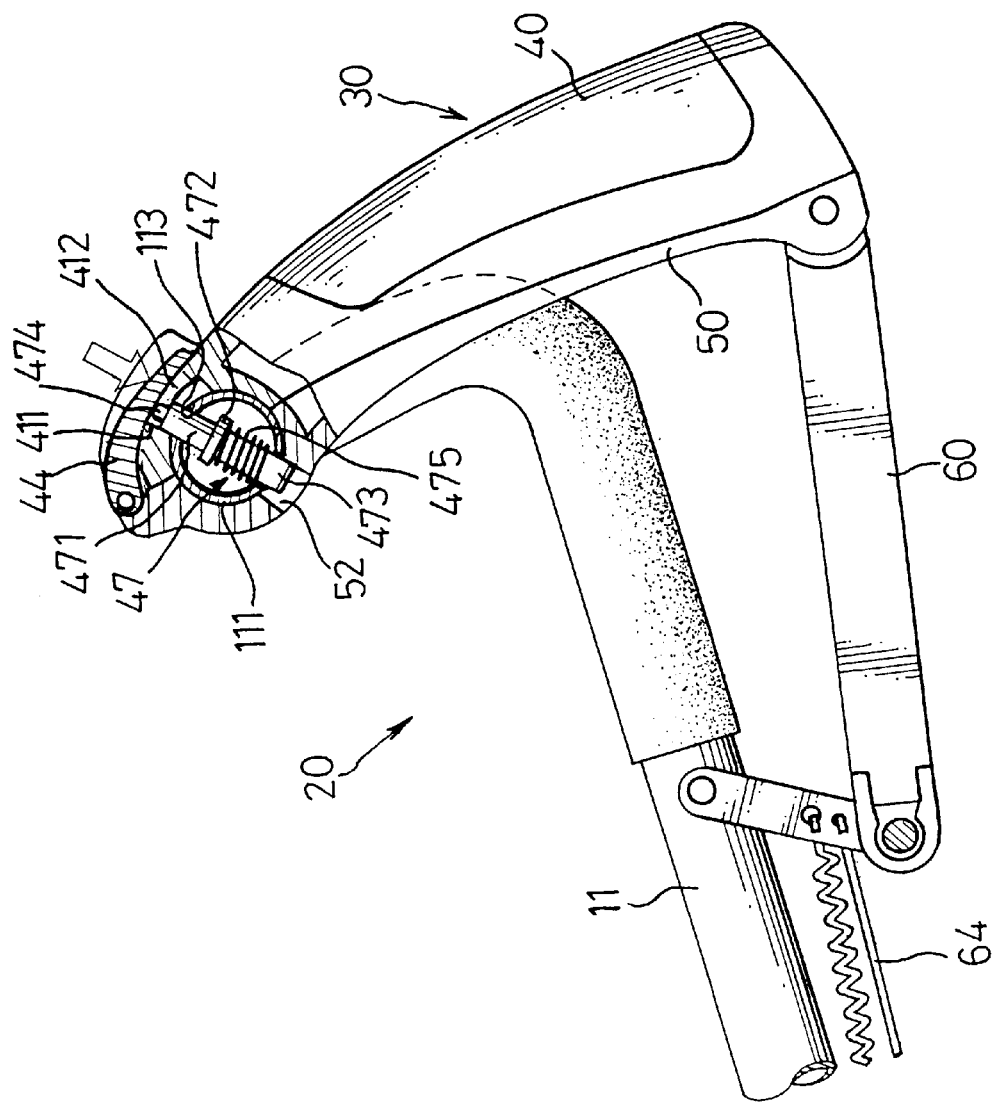
FIG. 5 is an operational view of FIG. 4.

In operation, referring to FIGS. 4–5 with reference to FIGS. 1–3, the boss 474 initially protrudes outward of the retaining bore 411 with the upper end portion 471 of the positioning pin 47 being retained in the retaining bore 411 such that the first end cap 41 of the first pivot base 40 of the pivot member 30 can be secured to the supporting rod 111. The pressing member 44 can then be pivoted relative to the first pivot base 40 of the pivot member 30 from a first position as shown in FIG. 4 to a second position as shown in FIG. 5 so as to press the boss 474 into the retaining bore 411 detaching the upper end portion 471 of the positioning pin 47 from the retaining bore 411 such that the first pivot base 40 of the pivot member 30 can be pivoted relative to the supporting rod 111 in a counterclockwise direction from a first position as shown in FIG. 5 to a second position as shown in FIG. 6 by means of the boss 474 being guided in the guiding groove 412, thereby moving the linking lever 60 and the drawing bar 62 which in turn move each of the two drawing wires 64 upward in an inclined manner.

Figure 6:
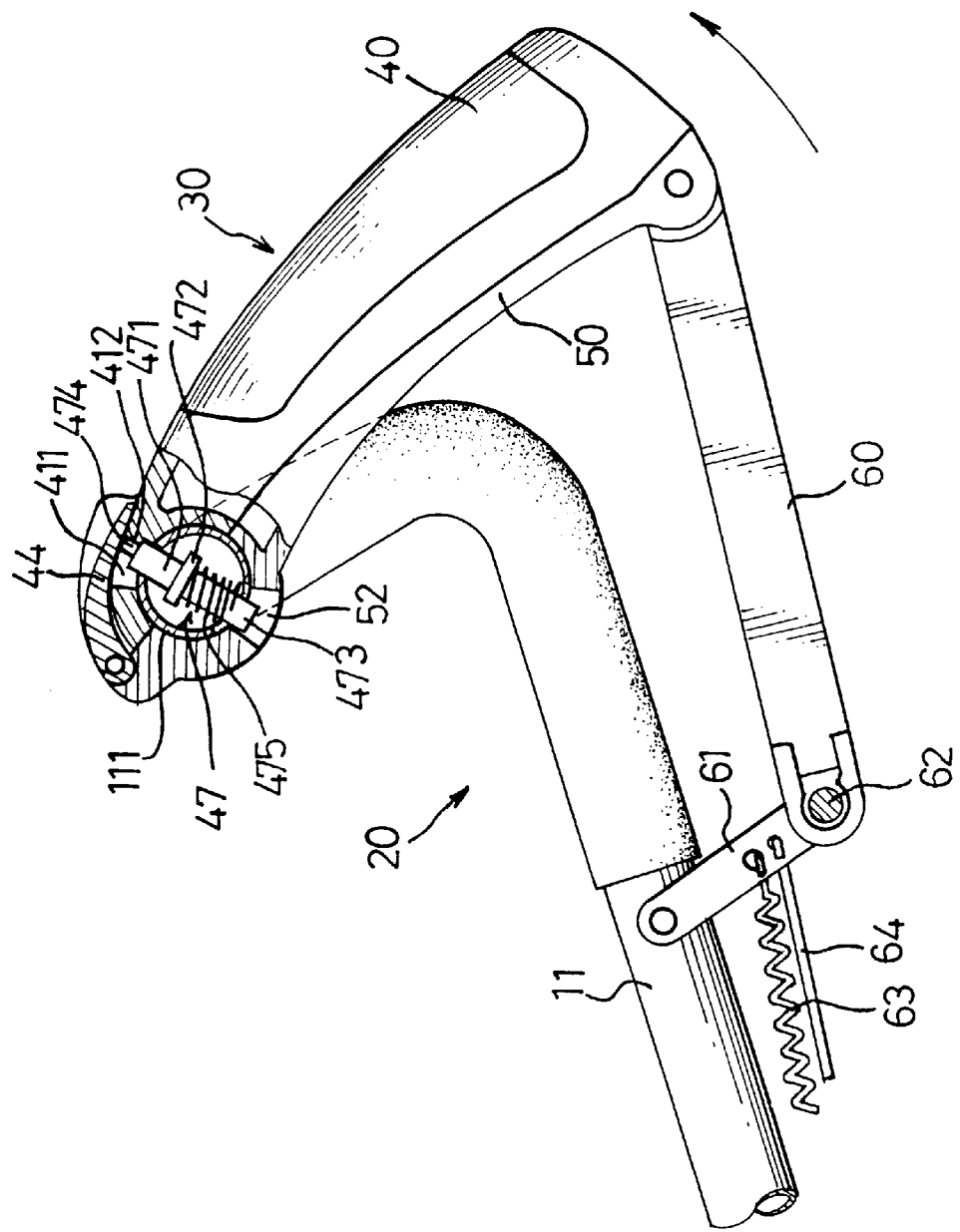
FIG. 6 is an operational view of FIG. 5.
Figure 7:
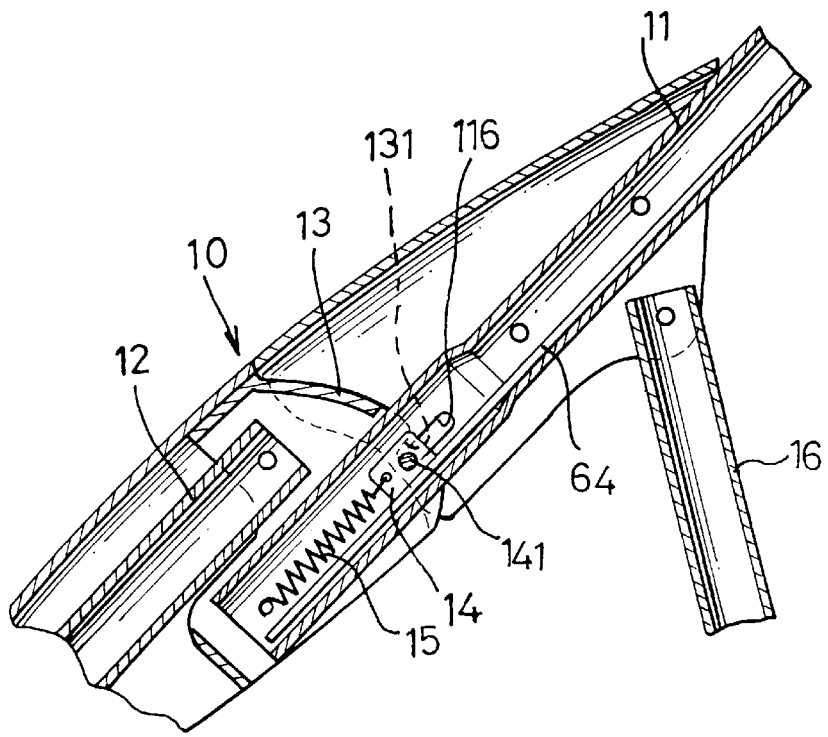
FIG. 7 is a front plan cross-sectional view of a release device in accordance with the present invention.
Figure 8:
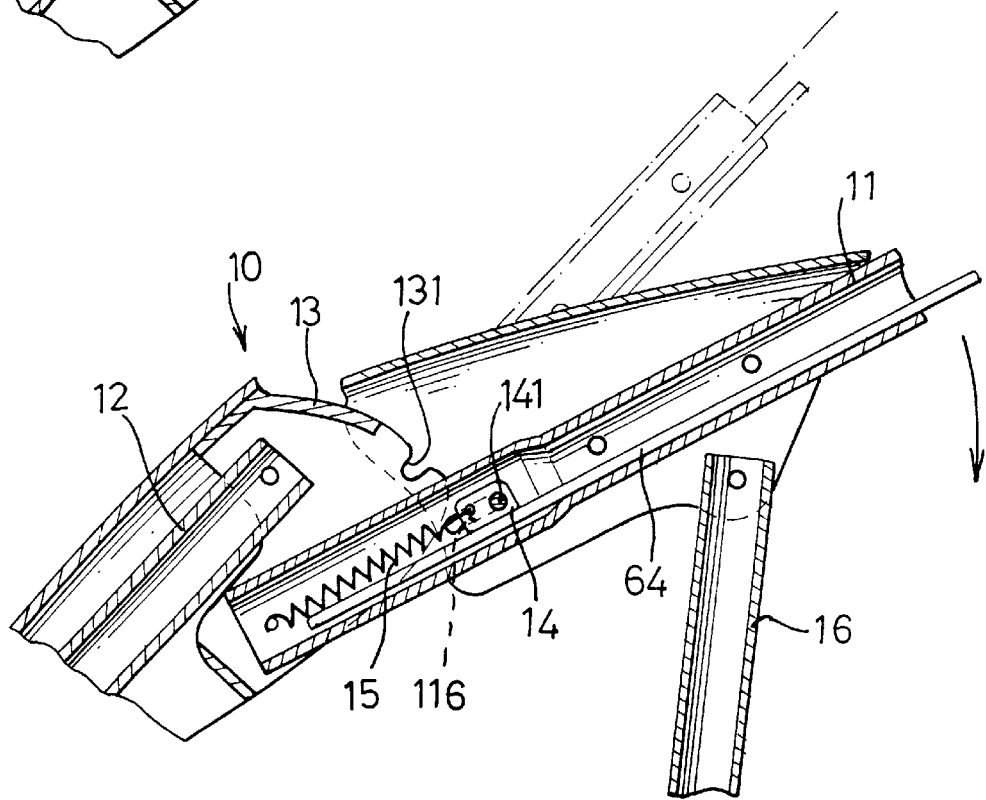
FIG. 8 is an operational view of FIG. 7.

Referring now to FIGS. 7 and 8 with reference to FIGS. 1–6, two locking members 13 are each mounted on the upper end portion of one of the two front legs 12 and each contain a locking recess 131, the lower end portion of each of the two push handles 11 contains an elongated slot 116, and each of the two release devices 10 comprises a slide 14 slidably mounted in the lower end portion each of the two push handles 11, a biasing member 15 including a first end portion fixed mounted in the lower end portion of each of the two push handles 11 and a second end portion fixedly mounted on the slide 14 to slide therewith, and a positioning rod 141 extending through the slide 14, slidably received in the elongated slot 116 and detachably locked in the locking recess 131. Each of the two drawing wires extends through each of the two push handles 11 and has its second end portion fixedly connected to the slide 14 for moving the slide 14.

When each of the two drawing wires 64 is moved upward in an inclined manner by means of pivoting the pivot member 30 as shown in FIGS. 4–6, the slide 14 of each of the two release devices 10 can be moved with the drawing wire 64 from a first position as shown in FIG. 7 to a second position as shown in FIG. 8, thereby detaching the positioning rod 141 from the locking recess 131 of each of the two locking members 13 such that each of the two front legs 12 can be pivoted relative to the respective push handle 11, thereby folding the stroller 1.

By such an arrangement, a user can easily fold the stroller with one hand only, thereby making it easier for the user to fold the stroller.

It should be clear to those skilled in the art that further embodiments may be made without departing from the scope and spirit of the present invention.

What is claimed is:

1. A stroller comprising:
   two front legs (12) each having an upper end portion and a lower end portion;
   two push handles (11) each having an upper end portion, a mediate portion and a lower end portion; said lower end portion detachably secured to said upper end portion of one of said two front legs (12);
   two rear legs (16) each having an upper end portion and a lower end portion, said upper end portion pivotally connected to said mediate portion of one of said two push handles (11);
   two release devices (10) each mounted between one of said two front legs (12) and one of said two push handles (11) for detaching said lower end portion of said push handle (11) from said upper end portion of said front leg (12);
   a substantially U-shaped handlebar (110) having two end portions each fixedly mounted on said upper end portion of one of said two push handles (11) and a mediate portion formed with a supporting rod (111); and
   a driving device (20) pivotally mounted on said supporting rod (111) of said handlebar (110) and including a connecting mechanism connected with each of said two release devices (10), wherein the pivotal movement of said driving device (20) moves said connecting mechanism which drives each of said two release devices (10) to detach said lower end portion of said push handle (11) from said upper end portion of said front leg (12).

2. The stroller in accordance with claim 1, wherein said connecting mechanism of said driving device (20) comprises a pivot member (30) pivotally mounted on said supporting rod (111) of said handlebar (110), a linking lever (60) including a first end portion and a second end portion; said first end portion pivotally connected with said pivot member (30), a substantially U-shaped drawing bar (62) pivotally secured to said second end portion of said linking lever (60) and including two end portions (620) each pivotally mounted on said upper end portion of one of said two push handles (11), and two drawing wires (64) each including a first end portion secured to one of said two end portions (620) of said drawing bar (62) and a second end portion secured to one of said two release devices (10) for detaching said lower end portion of each of said two push handles (11) from said upper end portion of each of said two front legs (12).

3. The stroller in accordance with claim 2, wherein said driving device (20) further comprises two returning springs (63) each including a first end portion secured to one of said two end portions (620) of said drawing bar (62) and a second end portion secured to said upper end portion of one of said two push handles (11).

4. The stroller in accordance with claim 2, wherein said supporting rod (111) of said handlebar (110) radially contains a through hole (113), and said pivot member (30) comprises:
   a first pivot base (40) including an upper end portion formed with a semi-cylindrical first end cap (41) pivotally mounted on said supporting rod (110) and containing a retaining bore (411) aligning with said through hole (113) and a guiding groove (412) open to said retaining bore (411) and having a dimension smaller than that of said retaining bore (411);
   a second pivot base (50) including an upper end portion formed with a semi-cylindrical second end cap (51) pivotally mounted on said supporting rod (110) and fixedly coupled with said first end cap (41), and including a lower end portion (55) pivotally connected with said first end portion of said linking lever (60);
   a positioning pin (47) including a lower end portion (473) mounted in said supporting rod (111), a mediate portion formed with an annular shoulder (472) abutting the inner wall of said supporting rod (111) and an upper end portion (471) slidably extending through said through hole (113) and said retaining bore (411) and having a dimension greater than that of said guiding groove (412), a boss (474) formed on said upper end portion (471) of said positioning pin (47) and extending outward of said retaining bore (411) and having a dimension smaller than that of said guiding groove (412);

a biasing member (475) mounted on said lower end portion (473) of said positioning pin (47) and abutting said inner wall of said supporting rod (111); and a pressing member (44) pivotally mounted on said first end cap (41) of said first pivot base (40) and pressing on said boss (474) of said positioning pin (47).

5. The stroller in accordance with claim 4, wherein said first end cap (41) of said first pivot base (40) is formed with two juxtaposed lugs (42) for receiving said pressing member (44) therebetween.

6. The stroller in accordance with claim 4, wherein said supporting rod (111) contains a large hole (112) for passage of said lower end portion (473) of said positioning pin (47) and said biasing member (475), and said second end cap (51) of said second pivot base (50) contains an elongated slot (52) for passage of said lower end portion (473) of said positioning pin (47).

7. The stroller in accordance with claim 2, further comprising two locking members (13) each mounted on said upper end portion of one of said two front legs (12) and each containing a locking recess (131), wherein said lower end portion of each of said two push handles (11) contains an elongated slot (116), and each of said two release devices (10) comprises a slide (14) slidably mounted in said lower end portion each of said two push handles (11), a biasing member (15) including a first end portion fixed mounted in said lower end portion of each of said two push handles (11) and a second end portion fixedly mounted on said slide (14) to slide therewith, and a positioning rod (141) extending through said slide (14), slidably received in said elongated slot (116) and detachably received in said locking recess (131), and each of said two drawing wires extending through each of said two push handles (11) and having its second end portion fixedly connected to said slide (14) for moving said slide (14).

\* \* \* \* \*